United States Patent [19]
Pfeilsticker

[11] 3,711,990
[45] Jan. 23, 1973

[54] CYLINDER MOUNTING FOR TOY DUMP TRUCK

[75] Inventor: Lee J. Pfeilsticker, Mound, Minn.

[73] Assignee: Tonka Corporation, Mound, Minn.

[22] Filed: March 8, 1971

[21] Appl. No.: 121,942

[52] U.S. Cl. ................................................46/214
[51] Int. Cl. .............................................A63h
[58] Field of Search.......................................46/214

[56] References Cited

UNITED STATES PATENTS

| 2,691,244 | 10/1954 | Steinke | 46/214 |
| 3,037,750 | 6/1962 | Cagan et al | 46/214 |

*Primary Examiner*—Louis G. Mancene
*Assistant Examiner*—J. Q. Lever
*Attorney*—Carlsen, Carlsen & Sturm

[57] ABSTRACT

A toy dump truck having a truck box hingedly mounted on a chassis for tilting movement between transport and dumping positions, a spring tensioned extension fluid jack having one end pivoted to the chassis and the other end pivoted to the box and biased toward an extended condition against a drainable fluid chamber to yieldably and slowly urge the box toward its dumping position, latch means for locking the box in transport position against spring tension of the jack, and one of said pivotal connections of the jack being slidable whereby when the latch means is released and the truck box is manually moved to a dumping position any stress on the jack will be minimized.

3 Claims, 3 Drawing Figures

PATENTED JAN 23 1973
3,711,990
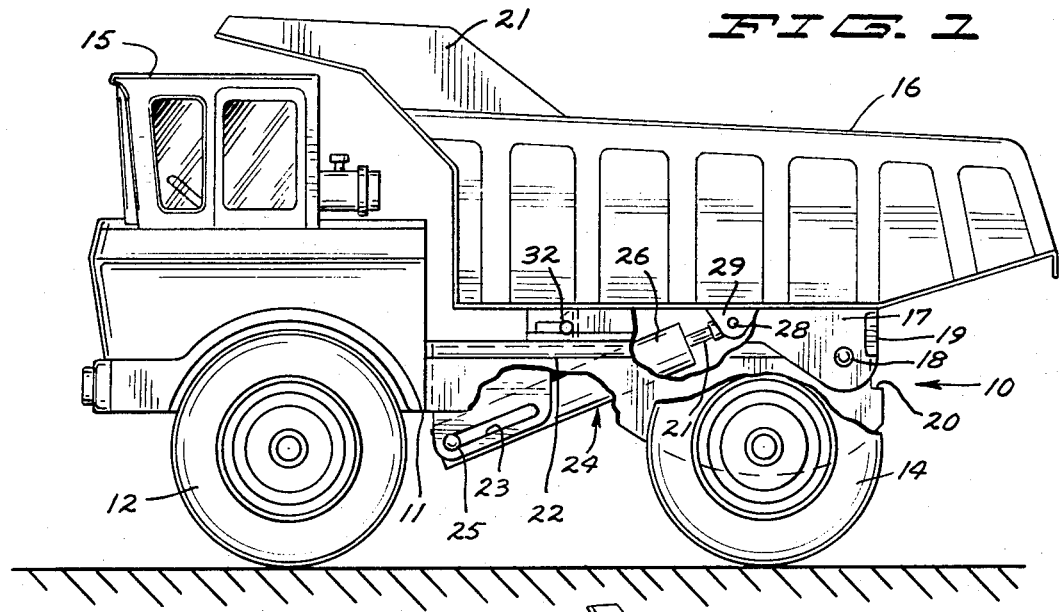
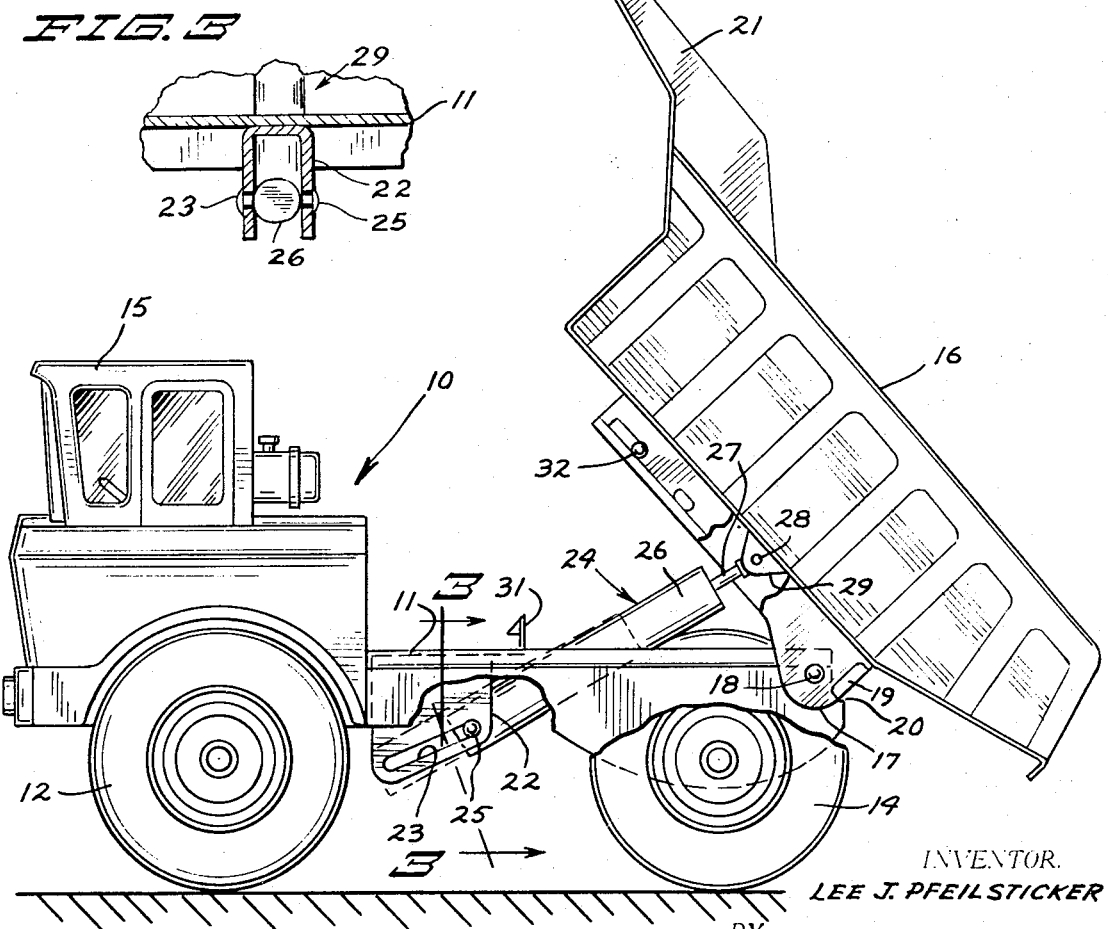
INVENTOR.
LEE J. PFEILSTICKER
BY
ATTORNEYS

CYLINDER MOUNTING FOR TOY DUMP TRUCK

BACKGROUND OF THE INVENTION

This invention is directed generally to toy dump trucks and more particularly to such trucks wherein the truck box is tilted to a dumping position by a fluid jack having internal spring means yieldably biasing the jack toward an extended condition. The jack also has a liquid contained within the cylinder which may slowly pass from one side of the piston to the other to cushion extension of the jack under pressure from the spring means or contraction of the jack against said spring means.

Toy dump trucks have been provided with fluid jacks connecting the truck chassis with the tiltable truck box. Such jacks normally contain a liquid adapted to move slowly through suitable port means from one side to the other of the piston with a coil spring normally biasing the jack toward an extended condition. Means are also provided for releasably latching the truck box to the chassis in transport or non-dumping position. When the latch means is released the jack will slowly extend under pressure of the spring means as the fluid passes from one side of the piston to the other, thus tilting the box to a dumping position. As the truck box is manually returned to its level or transport position the spring will be compressed and the fluid will return to the original side of the piston.

While the mechanism described works satisfactorily, it is found that the jack and its connections with the truck chassis and box may be damaged when the box is manually and quickly forced to its tilted position. This is especially true where the truck box is quite large and loaded with sand or other material.

SUMMARY OF THE INVENTION

Accordingly, the object of this invention is to provide a toy dump truck with a spring tensioned hydraulic jack for tilting the truck box to a dumping position and having means for preventing damage to the jack or its pivotal connections with the truck chassis and box when the box is manually forced to its dumping position.

With this and other objects in view the invention broadly comprises providing a stop means on the chassis for limiting dumping movement of the box and providing a sliding pivot between the jack and the chassis allowing the jack to be moved upwardly without extension until the stop is engaged. In the drawings:

FIG. 1 is a side elevation of a toy dump truck embodying the present invention with portions thereof broken away for better understanding of the dumping jack and the mounting thereof. In this view the truck is shown with the truck box in transport position with the jack contracted.

FIG. 2 is a side elevation of the truck with the truck box in full dumping position and also showing the jack in contracted condition.

DESCRIPTION OF THE PREFERRED EMBODIMENT

Referring now more particularly to the drawing reference numerals will be used to denote like parts or structural features in the different views. The truck denoted generally at 10 has a frame of chassis 11 supported on front and rear pairs of ground wheels denoted respectively at 12 and 14. An operator's cab 15 is mounted on the front portion of the chassis.

A truck box 16 has a pair of transversely spaced depending ears 17 which are pivoted to the rear portion of the chassis by a hinge pin 18 for movement of the box between a transport position (Fig. 1) and a dumping position (Fig. 2). A cross bar 19 connects the ears 17 to rigidify the ears and engage the stop shoulder 20 formed on the rear end of chassis 11 to limit dumping movement of the truck box 16. A cab protection shield 21 extends forwardly over cab 15 from the front end of truck box 16.

A pair of bracket plates 22 depend from the underside of the central portion of chassis 11 in transversely spaced relation. These plates have fore and aft extending aligned slots 23 which angle upwardly in their rearward extension on a common transverse plane directed over the axis of pin 18. An extension jack 24 of conventional design has a cross pin 25 extending through the end portion of cylinder 26 and through the slots 23. The jack extends upwardly through an opening in the center of the chassis and has an extensible piston rod 27 which is pivotally connected as by pin 28 to ears 29 depending from the underside of truck box 16.

The construction of jack 24 forms no part of the present invention and is accordingly not shown in detail. It should be understood, however, that it incorporates a spiral spring acting against a piston within the cylinder to extend the piston rod 27. The cylinder contains fluid which passes through a small port in the piston. Accordingly, when the jack is releases from a held contracted condition, the spring will slowly extend rod 27 as the fluid passes through the port. Conversely, as the jack is contracted against the force of the spring the fluid will pass to the opposite side of the piston.

A catch 31 projects upwardly from chassis 11. A spring held latch bar 32 adapted for releasable locking engagement with the catch 31 is mounted on the box 16. When the truck box 16 is in lowered or transport position the latch bar 32 is yieldably held in rearward locking engagement with catch 31. When latch bar 12 is moved forwardly it will be released from catch 31 allowing box 16 to be tilted upwardly to its dumping position.

In normal operation the child playing with the truck will merely move the latch bar 32 to a release position and the jack 24 will slowly extend under internal spring tension, with cross pin 25 remaining in the bottom ends of slots 23 until the cross bar 19 engages stop shoulder 20 on the chassis. This tilting movement occurs slowly due to the cushioning effect of the fluid in the jack passing from one side of the piston to the other.

Occasionally, however, after unlatching, a child will grasp the box at some point as by the shield 21 and manually pull the truck box 16 to its dumped position. In a construction where both ends of the jack 24 are on fixed pivots this can cause substantial damage to the jack and pivots particularly where the box is filled with soil material. With the present construction this cannot occur as the box can be moved to its dumping position, as shown in FIG. 2, without any tension being applied to the jack. On such an occasion cross pin 25 will merely slide upwardly in the slots 23 and then extend itself until the pin rests again in the bottom of the slots. Accordingly, the sliding pivot provided by pin 25 in slots 23 allows the jack 24 to perform its normal box tilting function and yet prohibits undue strain on the jack when the box is manually forced to its dumping position.

Having now therefore fully illustrated and described my invention, what I claim to be new and desire to protect by United States Letters Patent is:

1. In a toy dump truck,
   a. a truck chassis having ground wheels thereon,
   b. a truck box pivotally mounted on the chassis for movement between a lowered transport position and a raised dumping position,
   c. stop means on the chassis for limiting dumping movement of the truck box,
   d. a yieldably contractible slowly extendable extension jack having one end pivoted to the chassis and the other end pivoted to the truck box and having an extension force yieldably urging the truck box toward a dumping position,
   e. locking means for releasably locking the truck box in transport position against the extension force of the jack, and
   f. one of said pivots including a slide means coacting between the jack and the member to which it is pivoted for sliding of said pivot axially of the jack to allow manual movement of the truck box to its limited dumping position without extension of the jack.

2. The subject matter of claim 1 wherein said slide means is provided in the pivot between the jack and the chassis.

3. The subject matter of claim 1 wherein said slide means comprises a pair of brackets on the chassis or truck box having transversely aligned slots extending in a fore and aft direction, and a cross pin fixed to one end of the jack having its end portions riding in said slots.

* * * * *